(12) United States Patent
Triplett et al.

(10) Patent No.: US 11,453,351 B1
(45) Date of Patent: Sep. 27, 2022

(54) LIGHT APPARATUS

(71) Applicant: Camera Source, LLC, Muskego, WI (US)

(72) Inventors: Christopher Triplett, Muskego, WI (US); Kevin Pitterle, Watertown, WI (US)

(73) Assignee: Camera Source, LLC, Muskego, WI (US)

( * ) Notice: Subject to any disclaimer, the term of this patent is extended or adjusted under 35 U.S.C. 154(b) by 0 days.

(21) Appl. No.: 17/515,392

(22) Filed: Oct. 29, 2021

(51) Int. Cl.
*B60R 11/04* (2006.01)
*F21S 43/19* (2018.01)
*F21S 43/14* (2018.01)

(52) U.S. Cl.
CPC .............. *B60R 11/04* (2013.01); *F21S 43/14* (2018.01); *F21S 43/19* (2018.01)

(58) Field of Classification Search
CPC ..................................................... B60R 11/04
See application file for complete search history.

(56) References Cited

U.S. PATENT DOCUMENTS

| | | | |
|---|---|---|---|
| 7,609,961 B2 | 10/2009 | Park | |
| 7,619,680 B1 | 11/2009 | Bingle et al. | |
| 7,883,064 B2 | 2/2011 | Luft et al. | |
| 8,792,003 B2 | 7/2014 | Nakamura | |
| 9,446,721 B2 | 9/2016 | Jagoda | |
| 9,937,876 B2 | 4/2018 | Bingle et al. | |
| 10,621,445 B2 | 4/2020 | Higgins | |
| 10,625,689 B2 | 4/2020 | Yang | |
| 10,787,112 B2 | 9/2020 | Bell | |
| 10,887,556 B2 | 1/2021 | Diaz et al. | |
| 2003/0090569 A1 | 5/2003 | Poechmueller | |
| 2005/0046696 A1 | 3/2005 | Lang et al. | |
| 2007/0216770 A1* | 9/2007 | Chang | H04N 7/183 348/148 |
| 2009/0129112 A1* | 5/2009 | Shamitz | B60Q 1/56 362/549 |
| 2013/0058120 A1* | 3/2013 | Schutz | B60R 13/04 362/544 |
| 2016/0191863 A1 | 6/2016 | Minikey, Jr. et al. | |
| 2016/0272126 A1* | 9/2016 | Fisher | B60R 11/04 |
| 2017/0036647 A1* | 2/2017 | Zhao | B08B 3/02 |
| 2017/0057423 A1* | 3/2017 | Wang | B60R 1/00 |
| 2017/0249845 A1* | 8/2017 | Lettieri | B60R 11/04 |
| 2018/0281697 A1* | 10/2018 | Snider | H04N 7/183 |
| 2018/0287306 A1* | 10/2018 | Grimes | G03B 17/02 |
| 2019/0032374 A1* | 1/2019 | Linden | H04N 5/2351 |
| 2019/0237866 A1* | 8/2019 | Kiyokawa | H01Q 1/22 |

(Continued)

FOREIGN PATENT DOCUMENTS

DE 20313003 U1 1/2005

OTHER PUBLICATIONS

Christopher Triplett, "Third brake light of 2019 GMC Sierra", Muskego, WI USA, taken Aug. 3, 2021.

(Continued)

*Primary Examiner* — Eric T Eide (57) ABSTRACT

A light apparatus, system, and method to replace a vehicle light is disclosed which includes a retainer bracket attached to a light assembly and a camera housing attached to the light assembly, wherein the camera housing is configured to secure a digital or analog camera to the light assembly.

18 Claims, 7 Drawing Sheets

(56) References Cited

U.S. PATENT DOCUMENTS

2020/0171998 A1\* 6/2020 Kondo ................. B60Q 1/0017
2020/0180408 A1\* 6/2020 Jung ..................... F21S 43/195

OTHER PUBLICATIONS

Camera Source, LLC, "Factory camera relocation housing kit-Adjustable-COMING SOON!", https://camerasource.com/factory-camera-relocation-housing-kit-adjustable.html, website accessed Oct. 9, 2021, published Mar. 19, 2021.
Zorg North America LLC, "Multi-Vehicle LVDS Camera Relocation Kit", https://www.zorg-na.com/product/4210/, Accessed Oct. 9, 2021.

\* cited by examiner

LIGHT APPARATUS

BACKGROUND OF THE INVENTION

1. Field of the Invention

Embodiments of the present disclosure relate generally to cameras secured to a light on a vehicle, such as an automobile or trailer.

2. Background

Many vehicles, such as automobiles or trailers, include a camera on the rear of the vehicle that are configured to operate with an electronic system to display what the camera lens views to a user inside the vehicle. These cameras are useful, for example, to assist a user in backing a vehicle up or assist a user then in viewing blind spots. However, in some cases modifications may be made to the vehicle which may render the camera useless in its original location. One such example is on GM® branded trucks which include a camera as part of a third brake light located on the rear side of the truck cab, where the camera is faced rearward overlooking the bed of the truck. If a cap is added to back of the truck, this third brake light camera is rendered useless as its view is obstructed by the newly installed cap. It is desirous to be able to relocate a camera from one location to another location on the vehicle to accommodate such vehicle modifications. One example would be to relocate the camera in the previous example to a third brake light located on the back of the truck cap, or another location a light fixture or retainer bracket may be placed. Additionally, in the case of a trailer, it would be advantageous to be able to add a camera to a marker light or other light, but external to, a light fixture.

SUMMARY OF THE INVENTION

The invention relates, in one embodiment, to an apparatus configured to replace a vehicle light housing or secure to a vehicle to operate as a vehicle light, where the apparatus includes a retainer bracket connected to a light assembly, and a camera housing in communication with the light assembly, wherein the camera housing is configured to enclose a digital or analog camera. The retainer bracket is connected to the light assembly by at least one fastener, the camera housing is attached to the light assembly by at least one fastener, and the camera housing is in physical communication with at least one protrusion on the light assembly to help with correct placement of the camera housing on the light assembly. The light assembly contains at least one LED light and the camera housing is configured to securely hold the digital or analog camera and to reduce or eliminate glare or lens flare caused by the LED illumination.

The invention relates, in another embodiment, to a system including a retainer bracket connected to a light assembly, wherein the light assembly is attached to a camera housing which encloses a digital or analog camera. The camera housing may be adjustable to change the angle of view of the digital or analog camera.

The invention relates, in another embodiment, to a method for attaching a light apparatus to a vehicle including: enclosing a camera within a camera housing with an aperture formed therethrough, connecting the camera housing to a light assembly, attaching the light assembly to a retainer bracket, and securing the light apparatus to a vehicle.

DETAILED DESCRIPTION OF THE INVENTION

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

For the following defined terms, these definitions shall be applied, unless a different definition is given in the claims or elsewhere in this specification. Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary.

As used herein, the terms "bracket," "housing," and "assembly is intended to mean any material used to form an enclosure. Examples of such material include but are not limited to rigid or semi-rigid materials like plastic, metal, cardboard, and wood.

A light apparatus, system, and method will now be described with references in FIGS. 1-9. Turning to the drawings, where the reference characters indicate corresponding elements throughout the several figures, attention is first directed to FIG. 1 where a top perspective view of an embodiment of the light apparatus is shown, illustrating its composition and the apparatus is generally indicated by reference character 100. Light apparatus 100 comprises a retainer bracket 102 configured to replace a light housing, such as on a truck or trailer; a light assembly 104 connected to retainer bracket 102; and a camera housing 106 in communication with light assembly 104. A light system may comprise a retainer bracket 102 attached to a light assembly 104 and a digital or analog camera 108 retained within camera housing 106. Camera housing 106 is preferably centrally located against a top surface 170 of light assembly 104 and extends from the top edge to the bottom edge of top surface 170 but may be located against any portion of the top surface 170 of light assembly 104. Light apparatus 100 is configured to replace an existing light while also adding the capability to include a camera to view a desired region, such as being installed in the third brake light area of a truck cap or a marker light. It is contemplated light apparatus 100 may also be preinstalled on a vehicle in a location desired for a light, or in a location designed specifically for light apparatus 100.

Figure 1:
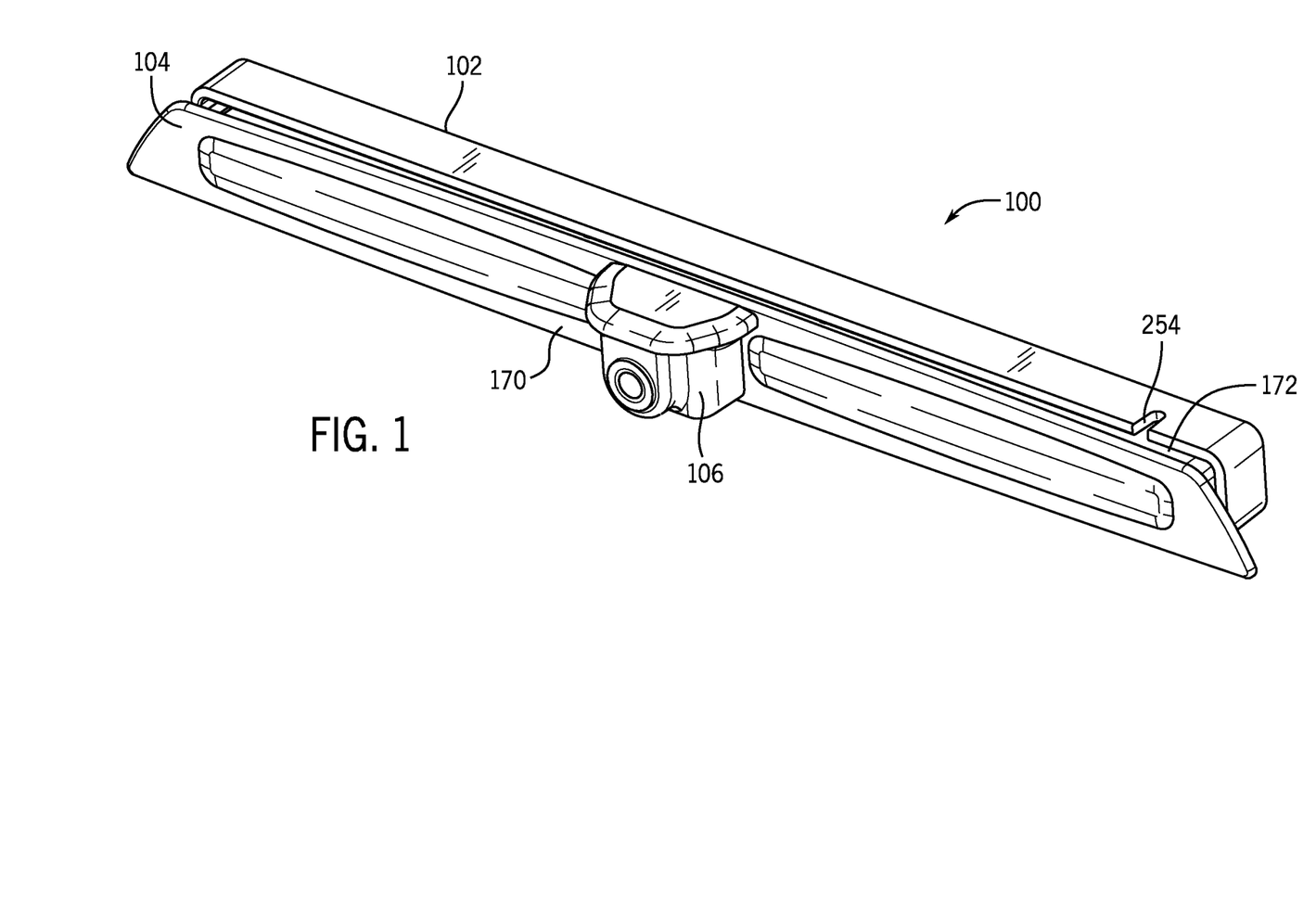
FIG. 1 is a top perspective view of an embodiment of the present invention.
Figure 2:
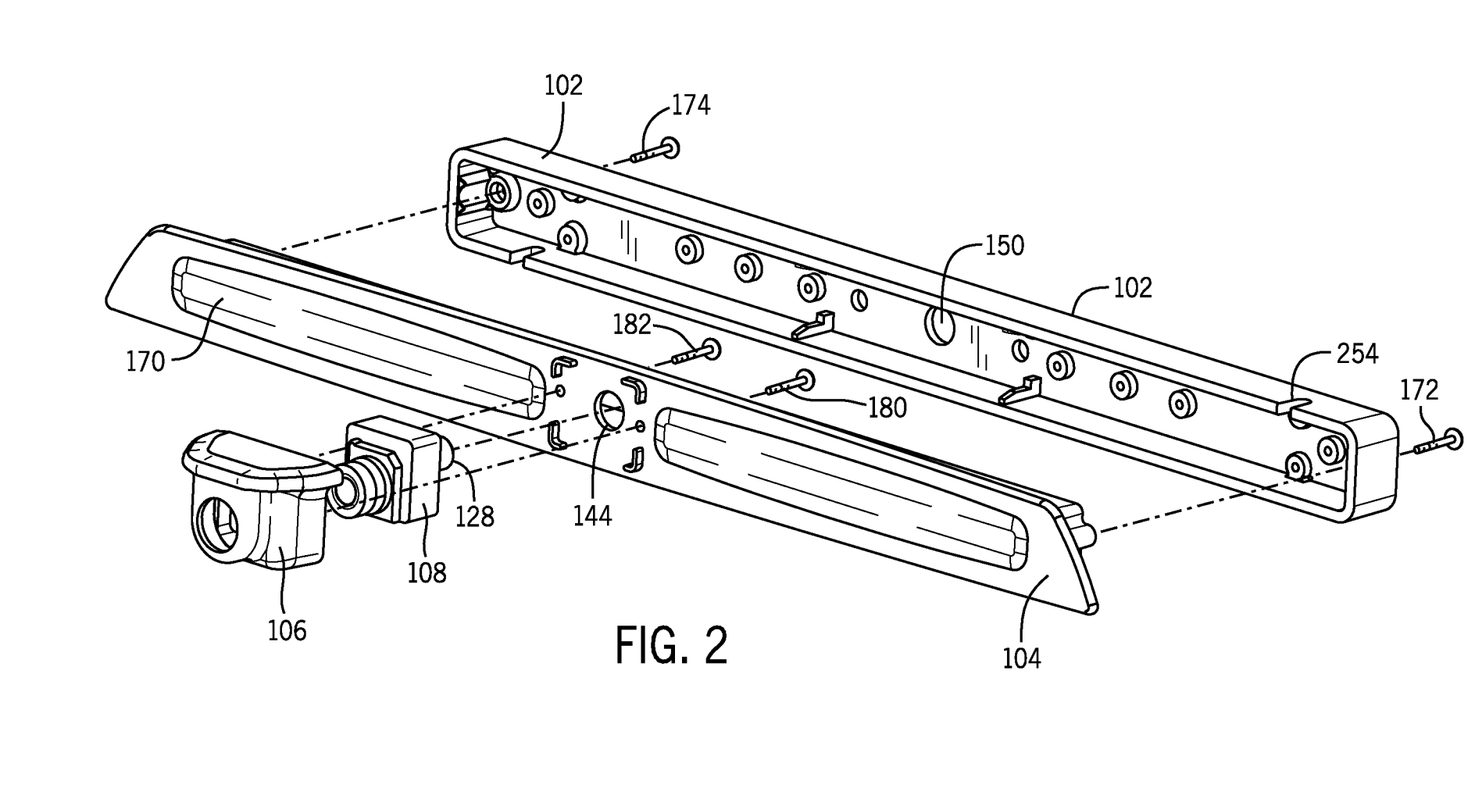
FIG. 2 is a front exploded view of an embodiment of the present invention.

Turning to FIG. 2, a front exploded view of an embodiment of the present invention is shown. Camera housing 106 is configured to enclose and maintain camera 108 in communication with light assembly 104. Camera 108 further comprises a plug 128 extending away from the back surface of camera 108, wherein plug 128 is configured to attach to a cord (not shown). Plug 128 extends through an aperture 144 formed therethrough light assembly 104 and may extend through an aperture 150 formed therethrough the rear surface of retainer bracket 102 and aligned with aperture 144, wherein the cord attaches to a camera viewing device (often inside the vehicle) configured to display output from camera 108 for display to a user. Aperture 144 of light assembly 104 is located in-line with plug 128 of camera 128 through the top surface 170 of the light assembly 104 and aperture 150 of retainer bracket 104 is centrally located through the rear surface of retainer bracket 104. The location of aperture 144 and aperture 150 may change to accommodate a different plug configuration of camera 108.

Figure 3:
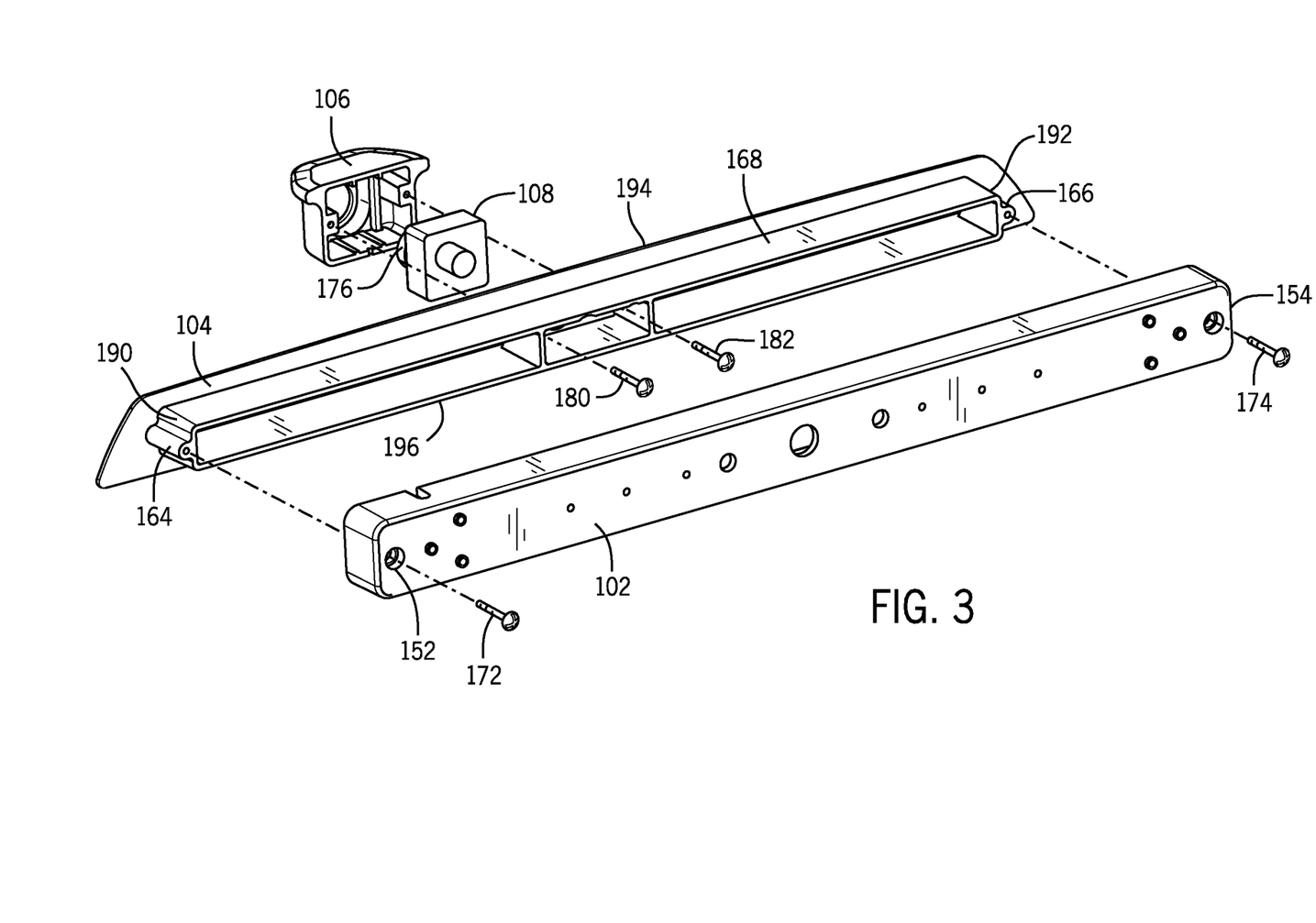
FIG. 3 is a rear exploded view of an embodiment of the present invention.

Turning to FIG. 3, a rear exploded view of an embodiment of the present invention is shown. Light assembly 104 further comprises a receiving portion 168 that is generally rectangular shaped, with a first short side 190, a second short side 192, a first long side 194, and a second long side 196, wherein short sides 190 and 192 as well as long sides 194 and 196 extend perpendicular to and away from top surface 170. Receiving portion 168 is configured to fit inside, or to be in slide into, retainer bracket 102, thereby creating a channel 172 (see FIG. 1) which allows apparatus 100 to mount to a vehicle wall, with light assembly 104 on one side of the wall and retainer bracket 102 on the other side of the wall, thereby sandwiching and securing light apparatus 100 to the wall when light assembly 104 and retainer bracket 102 are fastened together. Receiving portion 168 further comprises a first receptacle 164 on first short side 190 and a second receptacle 166 on second short side 192, wherein first receptacle 164 is configured to receive a first fastener 172 and the second receptable 166 is configured to receive a second fastener 174. Receiving bracket 102 further comprises a first passage 152 and a second passage 154, each formed therethrough the rear surface thereof. First passage 152 is located and configured in-line with first receptacle 164 and second passage 154 is located and configured in-line with second receptable 166 of receiving portion 168 of light assembly 104. First fastener 172 extends through first passage 152 and secures into first receptacle 164 and second fastener 174 extends through second passage 154 and secures into second receptacle 166, thereby attaching, or fastening, light assembly 104 to retainer bracket 102 and securing apparatus 100 to a vehicle wall. It is further contemplated light assembly 104 and retainer bracket 102 could be configured to mount to one side of a wall, such as by fasteners. In addition, light assembly 104 is configured to allow at least a portion of camera 108 to extend into or through it. Retainer bracket 102 may also be configured to allow at least a portion of camera 108 or a portion of the camera cord to extend into or through it.

Figures 4, 5:
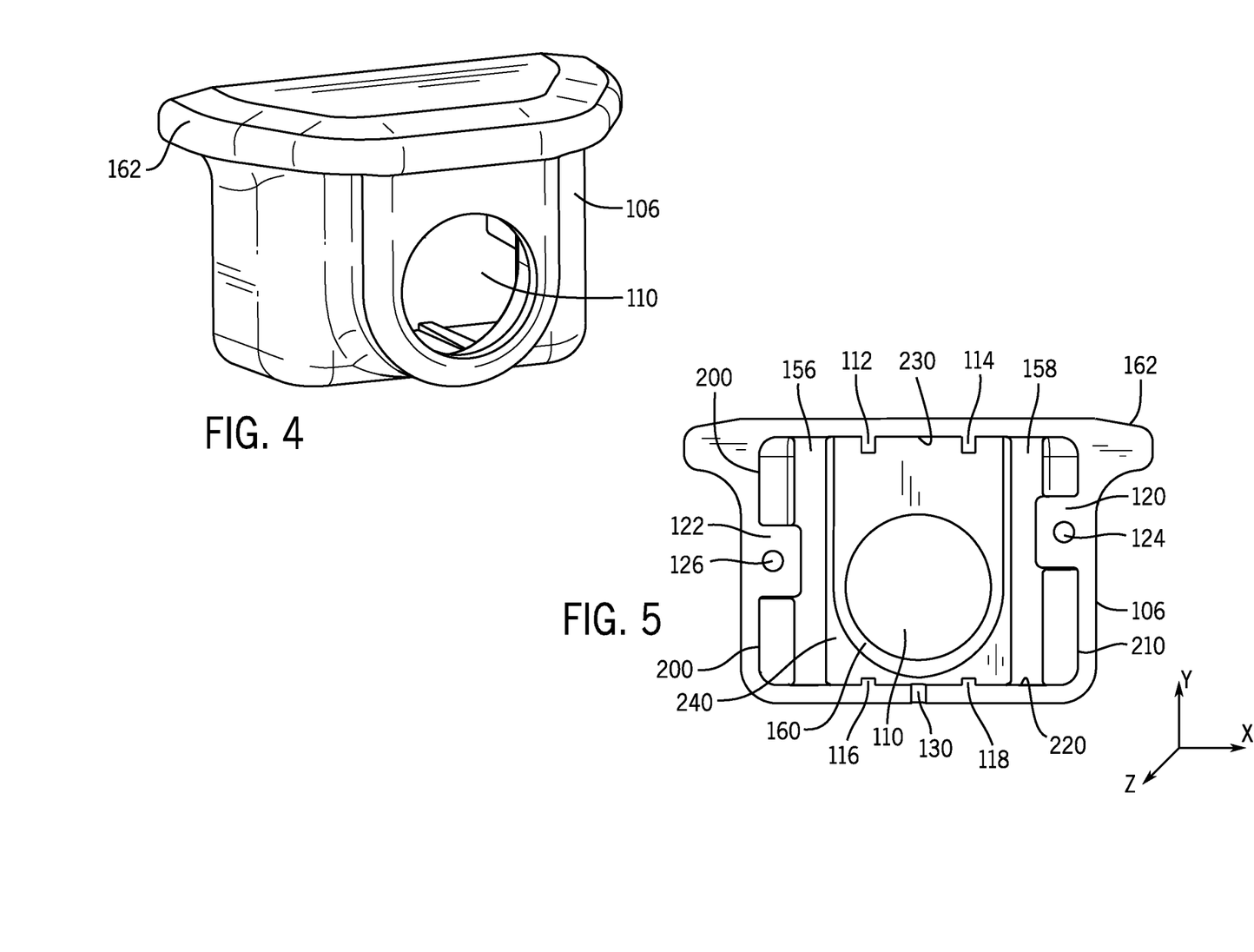
FIG. 4 is front perspective view of an embodiment of camera housing 106.
FIG. 5 is a rear view of an embodiment of camera housing 106.

Turning to FIG. 4, a front perspective view of an embodiment of camera housing 106 is shown. Camera 108 further comprises a lens 176 (see FIGS. 3 and 7). In addition, camera housing 106 further comprises an aperture 110 formed therethrough the front of camera housing 106 and is configured to allow lens 176 of camera 108 to extend through aperture 110 so that camera 108 may operate as desired. Camera housing 106 further comprises a lip 162 located around the top of camera housing 106, extending away from the front, right, and left sides of the housing and configured to keep rain and debris away from lens 176 of camera 108 which may otherwise obscure the view from camera lens. In the current embodiment lip 162 is rounded, but it may be any desired shape which performs the same stated purpose. Camera housing 106 is preferably opaque in order to reduce or eliminate glare or lens flare occurring in the viewable image produced by camera 108 caused by illumination of light assembly 104 by a LED, or other lighting method (described below).

Figure 6:
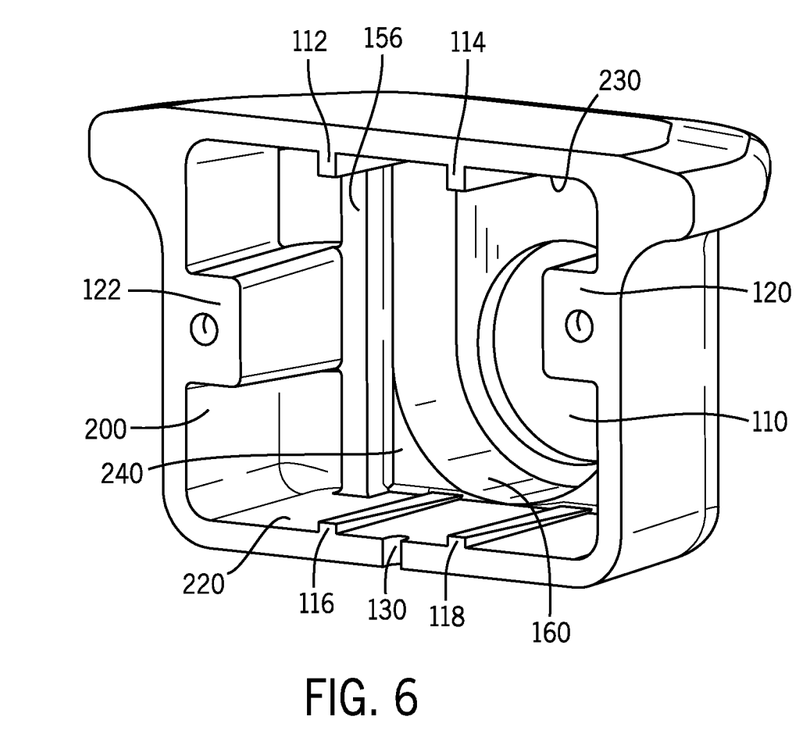
FIG. 6 is a rear perspective view of an embodiment of camera housing 106.

Turning to FIGS. 5 and 6, a rear view of an embodiment of camera housing 106 and a rear perspective view of an embodiment of camera housing 106 is shown. Camera housing 106 further comprises a first receptacle 122 located on a left interior wall 200 of housing 106, wherein the first receptacle 122 comprises a first cavity 126 configured to receive a first housing fastener 180. Camera housing 106 may further comprise a second receptacle 120 located on a right interior wall 210 of housing 106, wherein the second receptacle comprises a second cavity 124 configured to receive a second housing fastener 182. The location of first receptacle 122 is offset from the location of second receptacle 124 in order to ensure camera housing 106 is secured to light assembly 104 in just one possible orientation (and not accidentally upside down). Camera housing 106 further comprises a first standoff 112 and a second standoff 114 located on a top interior wall 230 of camera housing 106. Camera housing 106 further comprises a third standoff 116 and a fourth standoff 118 located on a bottom interior wall 220 of camera housing 106. First standoff 112 is in-line with third standoff 116, and second standoff 114 is in-line with fourth standoff 118. First standoff 112, second standoff 114, third standoff 116 and fourth standoff 118 as well as first receptacle 112 and second receptacle 124 are configured to be in communication with camera 108, thereby stabilizing camera 108 within camera housing 106 along the X-axis and Y-axis. It is contemplated first standoff 112 and second standoff 114 may be combined into a single standoff. Likewise, third standoff 116 and fourth standoff 118 may also be combined into a single standoff. Camera housing 106 further comprises a first slat 156 in communication with first receptacle 122 and a second slat 158 in communication with second receptacle 120, wherein first slat 156 and second slat 158 extend vertically along a front interior wall 240 of housing 106 and extend from top interior surface 230 to bottom interior surface 220 on either side of aperture 110 and are configured to stabilize camera 108 along the Z-axis. Camera housing 106 further comprises a semi-circular portion 160 extending from interior front wall 240 to aperture 110 and configured to surround lens 176 of camera 108.

While first receptacle 122 and second receptacle 120 are generally rectangular in a first shape and dimensions, such as for example, about 0.2"×0.6"×0.5"; first standoff 112, second standoff 114, third standoff 116, and fourth standoff 118 are generally rectangular of a second shape and dimensions, such as for example, about 0.1"×0.1"×0.9"; and first slat 156 and second slat 158 are generally rectangular of a third shape and dimensions, such as for example, about 0.1"×1"×0.1," each group of elements may be varied in shape as desired to retain a particular camera within camera housing 106. Last, camera housing 106 further comprises cutout 130 extending through the bottom interior wall 220 and configured to allow liquid drainage to prevent potential damage to camera 108 caused by inclement weather.

Figure 7:
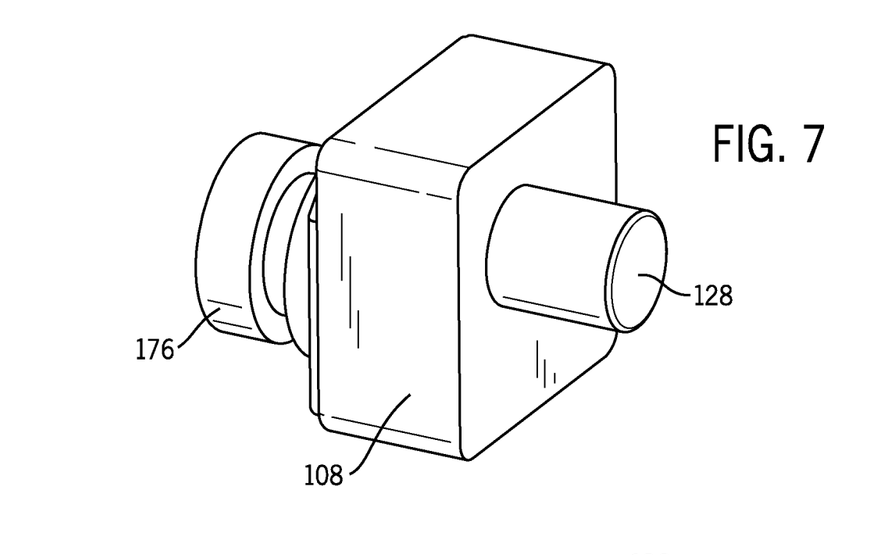
FIG. 7 is a rear perspective view of an embodiment of camera 108.

Turning briefly to FIG. 7, a rear perspective view of an embodiment of camera 108 is shown. While camera 108 currently has lens 176, plug 128, and the configuration shown which is also known as GM® part #84929557 and sold with GM® brand trucks since 2019, it is contemplated different embodiments of cameras and camera housings may be configured to hold and secure each camera type to a single light assembly 104, which allows the same light assembly to be utilized with a variety of camera types.

Figure 8:
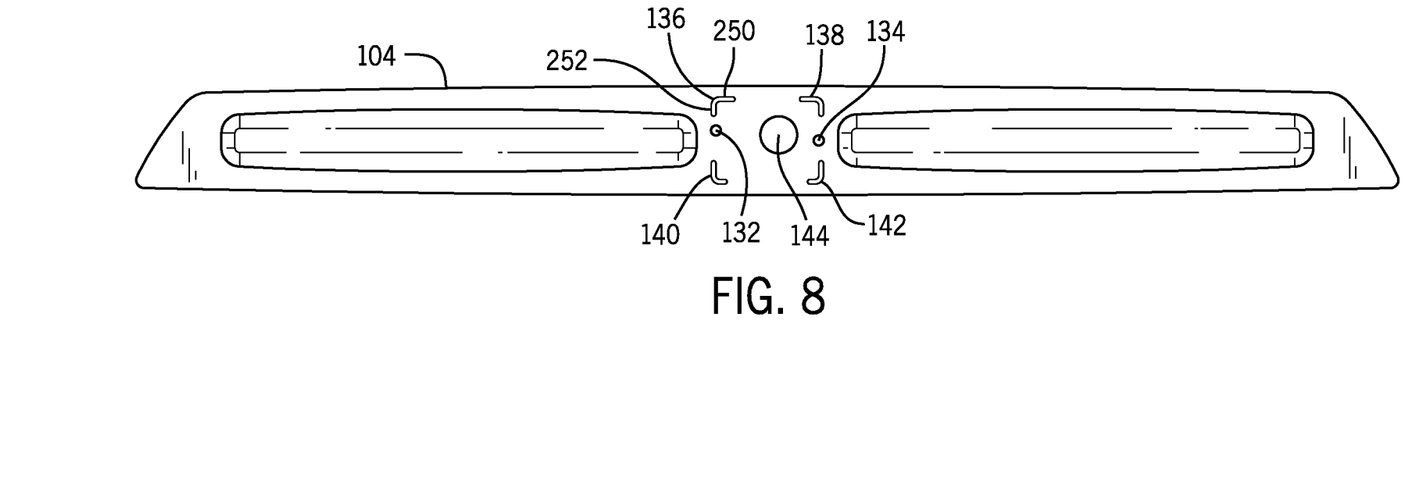
FIG. 8 is a front view of an embodiment of light assembly 104.

Turning to FIG. 8, a front view of an embodiment of light assembly 104 is shown. Light assembly 104 further comprises a first orifice 132 formed therethrough and located on one side of aperture 144 and a second orifice 134 formed therethrough and located on a second side of aperture 144. First orifice 132 and second orifice 134 and offset from one another, wherein first orifice 132 lines up with second cavity 124 of camera housing 106 so second housing fastener 182 (see FIG. 3) can extend through first orifice 132 and secure into second cavity 124, thereby securing camera housing 106 to light assembly 104. Likewise, second orifice 134 lines up with first cavity 122 of camera housing 106 so first housing fastener 180 (see FIG. 3) can extend through second orifice 134 and secure into first cavity 122 of camera housing 106, thereby further securing camera housing 106 to light assembly 104. To assist in aligning camera housing 106 and light assembly 104, light assembly 104 further comprises a first protrusion 136, located on and extending away from the top surface 170 of light assembly 104. First protrusion 136 further comprises a first side 250 and a second side 252, wherein the first side 250 is perpendicular to the second side 252 in a "V" shape. First side 250 of first protrusion 136 is configured to be physical communication with a first interior wall of camera housing 106 (top interior wall 230 in this case) and second side 252 of first protrusion 136 is configured to be in physical communication with a second interior wall of camera housing 106 (right interior wall 210 in this case) that is adjacent to the first interior wall, which also causes plug 128 of camera 108 to align with aperture 144 of light assembly 104. To further assist in the efficient and proper alignment of camera housing 106 and light assembly 104, a second protrusion 138, third protrusion 142, and fourth protrusion 140 may be utilized, wherein all have the same shape as first protrusion 136 but are oriented in 90 degree variations to each other and located around aperture 144 so that second protrusion 138 is in physical communication with with top interior wall 230 and left interior wall 200, third protrusion 142 is in physical communication with left interior wall 200 and bottom interior wall 220, and fourth protrusion 130 is in physical communication with right interior wall 210 and bottom interior wall 220. That is, first, second, third and fourth protrusions 136, 138, 142, and 140 are located along the interior perimeter of camera housing 106. Fasteners 180, 182, 127 and 174 may be varied in size and may comprise screws, bolts, push-fittings, or other known securing types. Further, while camera housing 106 is secured to light assembly 104 in a fixed position, it is contemplated camera housing 106 could be configured to be movable or rotatable about at least one axis so the viewing angle of camera 108 may be altered as desired by the user, such as by configuring right interior wall 210 and left interior wall 200 to each pivot, thereby rotating camera 108.

Figure 9:
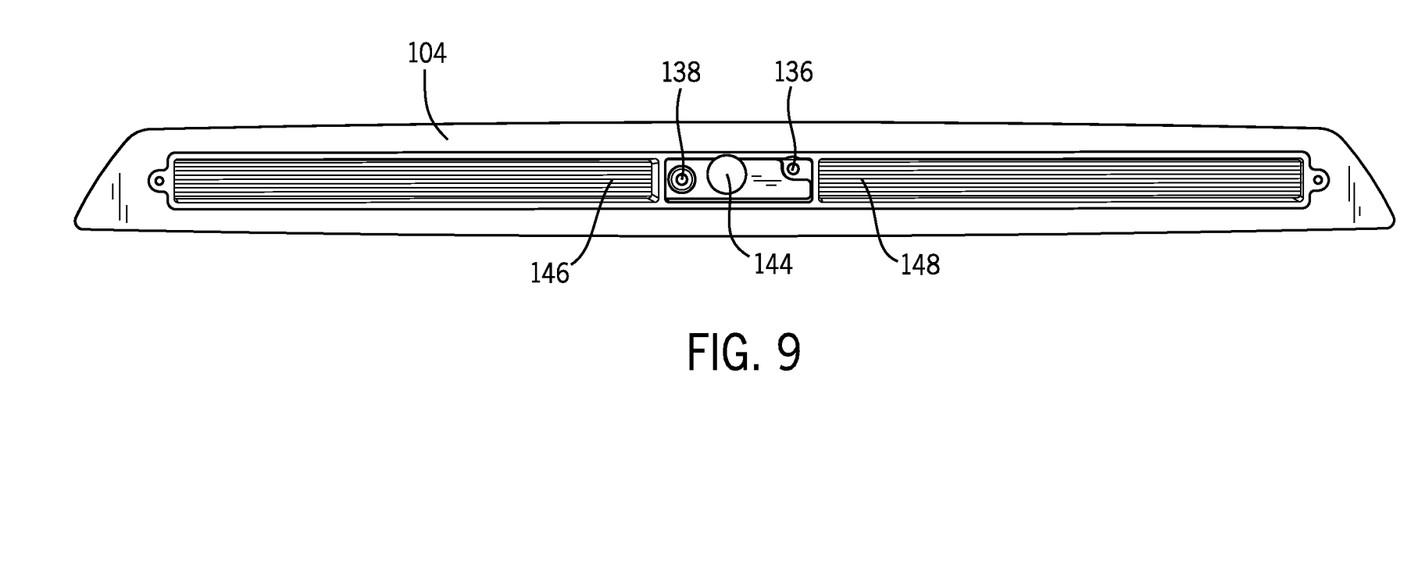
FIG. 9 is a rear view of an embodiment of light assembly 104.

Turning to FIG. 9, a rear view of an embodiment of light assembly 104 is shown. Receiving portion 168 of light assembly 104 further comprises at least one illumination cavity 146, but preferably includes a second illumination cavity 148, each which includes a light, such as a LED light (not shown), or strip of lights, affixed within each cavity, generally to at least one cavity surface. Power for each light may attach to each light by a cable extending through a notch 254 located in retainer bracket 102 (see FIG. 1) and attached to a power source, such as a vehicle battery. Light apparatus 100 is configured so camera 108 may operate effectively, without glare or lens flare regardless of LED/light illumination or not within light assembly 104.

A light apparatus 100 may be attached to a vehicle by first enclosing a digital or analog camera 108 with a lens 176 within a camera housing 106 with an aperture 110 formed therethrough for the lens 176 of camera 108 to extent through, then connecting the camera housing 106 to a light assembly 104, and finally attaching the light assembly 104 to a retainer bracket 102, wherein the light assembly 104 and retainer bracket 102 sandwich and secure to a wall of a vehicle.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. A light apparatus comprising:
   a retainer bracket configured to secure to a vehicle;
   a light assembly comprising a top surface configured to at least partially emit light, the light assembly connected to the retainer bracket; and
   a camera housing in communication with the light assembly; wherein the camera housing is configured to enclose a digital or an analog camera by sandwiching the camera between the camera housing and the top surface of the light assembly;
   wherein the retainer bracket further comprises an aperture configured to allow at least a portion of the camera or a portion of a camera cord to extend through it.

2. The apparatus of claim 1 wherein the vehicle is a truck, and the retainer bracket is configured to replace the third brake light of the truck cap.

3. The apparatus of claim 1 wherein the camera housing further comprises a first receptacle with a first cavity and a second receptacle with a second cavity, wherein the first and second cavity are each configured to receive a fastener.

4. The apparatus of claim 3 wherein the light assembly further comprises a first orifice and a second orifice formed therethrough, wherein the first and second orifice are offset from one another and each configured to allow the fastener to extend through the light assembly and into the camera housing.

5. The apparatus of claim 4 wherein the light assembly further comprises at least one protrusion configured to be in physical communication with the camera housing, aligning the first orifice of the light assembly with the second cavity of the camera housing and the second orifice of the light assembly with the first cavity of the camera housing.

6. The apparatus of claim 5 wherein the at least one protrusion further comprises a first side and a second side, wherein the first side is perpendicular to the second side.

7. The apparatus of claim 6 where the first side of the at least one protrusion is in communication with a first side of the interior of the camera housing and the second side of the at least one protrusion is in physical communication with the second side of interior of the camera housing.

8. The apparatus of claim 7 wherein the first side of the interior of the camera housing and the second side of the interior of the camera housing are adjacent to each other.

9. The apparatus of claim 1 wherein the light assembly is configured to allow at least a portion of the camera to extend through it.

10. The apparatus of claim 1 wherein the camera housing further comprises an aperture formed therethrough which allows a digital or analog camera lens to extend through it.

11. The apparatus of claim 1 wherein the light assembly further comprises at least one LED light located adjacent to the camera housing.

12. The apparatus of claim 1 wherein the camera housing is opaque.

13. The apparatus of claim 1 wherein the camera housing is centrally located on the light assembly.

14. The apparatus of claim 1 wherein the camera housing is separate from the light assembly.

15. The apparatus of claim 1 wherein the camera housing further comprises at least one first standoff extending away from the top interior wall of the camera housing and at least one second standoff extending away from the bottom interior wall of the camera housing, wherein the at least one first standoff and at least one second standoff are configured to be in physical communication with the camera.

16. A light system comprising:
a retainer bracket configured to replace a vehicle light housing;
a light assembly including a top surface configured to at least partially emit light, the light assembly connected to the retainer bracket;
a camera housing in communication with the light assembly; and
a digital camera or an analog camera;
wherein the top surface of the light assembly is configured to be in physical communication with the camera housing and the camera housing is configured to retain the camera;
wherein the retainer bracket further comprises an aperture configured to allow at least a portion of the camera or a portion of a camera cord to extend through it.

17. A method for relocating a camera on a vehicle comprising: removing a camera from an existing location on a vehicle, enclosing the camera within a light apparatus comprising a camera housing with an aperture formed therethrough and a light assembly with a top surface configured to at least partially emit light by sandwiching the camera between the camera housing and the top surface of the light assembly, and securing the light apparatus to the existing or a different location on the vehicle.

18. The method of claim 17 wherein the light apparatus is attached to the vehicle by sandwiching a wall of the vehicle between the light assembly and a retainer bracket.

* * * * *